United States Patent [19]
Wheatley

[11] Patent Number: 5,934,735
[45] Date of Patent: Aug. 10, 1999

[54] CONNECTOR ASSEMBLY

[76] Inventor: Donald G. Wheatley, 4451 Ford Rd., Ann Arbor, Mich. 48105

[21] Appl. No.: 08/856,898

[22] Filed: May 15, 1997

[51] Int. Cl.$^6$ ..................................................... B60P 7/02
[52] U.S. Cl. ................................ 296/100.01; 296/100.16; 296/100.17; 296/100.18
[58] Field of Search ........................ 296/100.01, 100.16, 296/100.17, 100.18; 160/381, 382, 383, 389, 391, 395, 402, 403; 403/167.171, 170.217, 329.291; 135/909

[56] References Cited

U.S. PATENT DOCUMENTS

| | | | |
|---|---|---|---|
| 906,914 | 12/1908 | Nelson | 160/403 |
| 3,426,367 | 2/1969 | Bradford | 403/329 |
| 3,472,539 | 10/1969 | Fenwick | 403/171 |
| 4,017,943 | 4/1977 | Moore | 403/217 |
| 4,181,230 | 1/1980 | Acuff | 403/329 |
| 4,187,576 | 2/1980 | Deibel et al. | 403/329 |
| 4,247,216 | 1/1981 | Pansini | 403/329 |
| 4,431,331 | 2/1984 | Brody | 403/329 |
| 4,528,998 | 7/1985 | Gamm | 135/909 |
| 4,639,033 | 1/1987 | Wheatley . | |
| 4,682,618 | 7/1987 | Zwick | 135/89 |
| 4,730,866 | 3/1988 | Nett . | |
| 4,838,602 | 6/1989 | Nett | 296/100.18 |
| 5,058,340 | 10/1991 | Muller | 52/222 |
| 5,058,652 | 10/1991 | Wheatley . | |
| 5,121,960 | 6/1992 | Wheatley . | |
| 5,152,574 | 10/1992 | Tucker . | |
| 5,207,262 | 5/1993 | Rushford . | |
| 5,251,951 | 10/1993 | Wheatley . | |
| 5,261,719 | 11/1993 | Tucker | 296/100.18 |
| 5,275,458 | 1/1994 | Barben et al. . | |
| 5,301,913 | 4/1994 | Wheatley . | |
| 5,310,238 | 5/1994 | Wheatley . | |
| 5,365,994 | 11/1994 | Wheatley . | |
| 5,460,423 | 10/1995 | Kersting et al. . | |
| 5,472,256 | 12/1995 | Tucker . | |
| 5,487,585 | 1/1996 | Wheatley | 296/100.18 |
| 5,540,475 | 7/1996 | Kersting et al. . | |
| 5,553,652 | 9/1996 | Rushford . | |
| 5,590,974 | 1/1997 | Yang | 403/171 |

*Primary Examiner*—Joseph D. Pape
*Assistant Examiner*—Kiran Patel
*Attorney, Agent, or Firm*—Chupa & Alberti, P.C.

[57] ABSTRACT

A connector assembly effective to selectively form a tonneau cover frame. In one embodiment of the invention, the connector assembly comprises a plurality of corner members 12 having a base 14 from which two substantially similar plugs 16, 18 project, and from which two substantially similar clips 20, 22 project. The assembly further includes a plurality of generally hollow rails 36, each having substantially identical ends which include a plurality of openings 40, 42 which allow one plug 16, 18 to be removably secured into one of the rails 36 by means of one of the clips 20, 22.

12 Claims, 8 Drawing Sheets

_Fig-5_

_Fig-6_

CONNECTOR ASSEMBLY

FIELD OF THE INVENTION

The present invention generally relates to a connector assembly and, more particularly, to a corner member and rail connector assembly which is effective to permit relatively simple, quick, consistent and secure formation of a tonneau cover frame which may be easily and selectively secured to a vehicle and/or easily disassembled for storage.

BACKGROUND OF THE INVENTION

Tonneau covers are generally used to cover the bed of a vehicle, such as and without limitation, a pick-up truck. A typical tonneau cover includes two primary components: a cover sheet made of fabric or other flexible, preferably waterproof, material; and a frame to which the perimeter of the cover sheet is removably attached and which is usually adapted and employed to removably position the cover sheet or material over the bed of a vehicle, such as a pick-up truck. The frame generally comprises four rails: a left and right side rail, which are removably affixed to each respective and opposed sidewall of the pick-up bed, and a front and rear rail, which are respectively positioned near the passenger cab and the tailgate. Moreover, the front and rear rails are usually connected to each of the side rails by connecting or "corner" members which are generally manufactured from a material, such as, and without limitation, aluminum or plastic and which allow the rails to cooperatively and removably form a tonneau cover frame. The preferred method of manufacture of the rails is by extrusion of a durable, lightweight material, such as, and without limitation, aluminum.

The side rails are oftentimes rigidly attached to the side walls of the pick-up bed by clamps, bolts, or other adhesive means and generally extend along the upper rims of those walls, as shown and described in U.S. Pat. Nos. 4,639,033 and 5,058,652 of Wheatley, as well as in U.S. Pat. Nos. 4,730,866 and 4,838,602 of Nett, all of which are fully and completely incorporated herein by reference, word for word and paragraph for paragraph. In these prior connector assemblies, the front rail is rigidly attached to the front wall of the pick-up bed by similar means or removably attached to the side rails by these connecting or "corner" members. The rear rail is similarly and removably attached to the side rails by these connecting or "corner" members.

In most of these prior tonneau cover assemblies, the cover sheet generally remains attached to the front rail, and is adapted to be moveable from a first "rolled up" or non-operative position in which the cover is secured to the front rail by straps, to a second fully extended and operable position in which it covers all of the rails and protects the truck or vehicle bed. The front of the cover sheet is generally attached to the front rail using a cylindrical dowel member which is sewn into the cover fabric or by means of an extruded member, a portion of which is generally cylindrical or generally semi-cylindrical in shape, and which is also sewn into the cover fabric. The dowel or extruded member is generally manufactured from a flexible material such as, but not limited to plastic. The outer edge of the front rail has a circular, concave bight which extends the entire length of the rail. The dowel (or portion of the extruded member) is made to be approximately as long as the front rail and to have a diameter slightly smaller than the bight so that it may easily slide into the rail from one end but remain frictionally engaged in the front rail bight. Once the dowel (or portion of the extruded member) is slid into the rail, the corner members may be attached to both ends of the front rail in a manner which allows the front rail to be connected to the side rails.

Various assemblies have been used to operatively connect these various rails to form or create a tonneau frame. Most assemblies employ corner members which have a somewhat triangular configuration, as described in U.S. Pat. No. 5,121,960 of Wheatley, which is herein incorporated by reference, word for word and paragraph for paragraph. In one type of prior connector assembly, each of the corner members has a pair of plugs which are orthogonally positioned or disposed at a right angle with respect to each other and which are received by the hollow ends of the rails. When the perimeter of the sheet is attached to the rails, the corner members and the front and rear rails are held in place through fabric tension created by the sheet. The plugs may also have flexible barbs which fill the hollow ends of the rails, thereby creating a frictional force which aids in holding the corner members and rails in place. One drawback associated with this first type of prior connector assembly is that the tension created by the extended sheet is used to hold the rails in place. Thus, when a truck is being driven, or otherwise utilized, without the cover sheet extended to its operable position and attached to hold the rails in place, the corner members and rails will often loosen due to the vibration of the vehicle. Such vibration can cause disturbing audible noise or even result in the detachment and loss of corner members and/or rails.

Another type of prior connector assembly utilizes and includes a plurality of holes which are bored into the sides of the rails and which correspond to substantially similarly sized holes which reside in the plugs of the corner members. The plugs are received by the hollow ends of the rails and pins or plastic rods are inserted into the holes and lock the corner members and rails together. This assembly generally provides more security than the previously described connector assembly. However, a significant amount of time is required to connect and disconnect the rails and corner members since the holes must be aligned before the pins or rods are inserted. Furthermore, the pins and rods may loosen due to vibration causing disturbing vibratory noise and/or the detaching and loss of corner members and/or rails.

Yet another prior assembly utilizes and includes screw fasteners which secure the plugs into the rails. One such assembly is described in U.S. Pat. No. 5,251,951 of Wheatley, which is herein incorporated by reference, word for word and paragraph for paragraph. While more secure than the previously described assemblies, this connector assembly requires the costly threading of its various parts. Furthermore, the assembling and disassembling of the tonneau frame requires an operator to respectively fasten and unfasten a multitude of screws, resulting in a substantial investment of time. Moreover, the screws utilized in this assembly can also loosen with extended usage, resulting in an unstable frame and the potential detachment and loss of corner members, rails and screws.

Perhaps the most secure, cost effective and convenient connector assembly to date has utilized plastic clips which are formed as an integral part of each corner member. In this assembly, each corner member comprises a substantially "one piece" assembly with two plastic clips, each clip corresponding to one of the two plugs of the corner member. The plastic clips each have a "button" or detent which must be manually depressed by a user while the plug is simultaneously inserted into the hollow rail end. To remove each corner member, the button or detent is manually depressed while the corner is pulled away from the rail to which it is attached. A first drawback associated with this assembly is that both the insertion and the removal of the corner members require two separate actions which must occur simultaneously. That is, the detent must be depressed at the same time that the plug is inserted or removed from the rail. This makes connecting and disconnecting the tonneau frame more time consuming and difficult than it would otherwise be with a one-step procedure. A second drawback is that the plastic clip engages the rail at substantially the same moment as the plug, making the assembly procedure "clumsy" and inconsistent. This condition also demands substantial time and concentration from the user or installer, and if insertion is made at an improper angle, the plastic clip may become deformed or break.

All of the aforementioned prior connector assemblies suffer from yet another drawback. That is, in all of the aforementioned prior assemblies, in order to attach or remove the tonneau cover sheet, an operator must first disconnect the front rail and remove the attached corner members. This is necessary because the cylindrical bight cannot be exposed until the corner member(s) is removed. This process is cumbersome, time consuming and requires that the front rail be positioned (or located) at some distance away from the front of the pick-up cab so that it may be removed without removal of the side rails.

There is therefore a need to provide a connector assembly which allows for the relatively easy formation of a tonneau frame and which overcomes some or all of the difficulties and drawbacks of the various previously delineated prior art designs; which is relatively inexpensive to manufacture; and which uses a corner member having a plastic clip and a plug and which is adapted to allow the plug to be inserted into a hollow rail end before the clip engages the rail, thereby ensuring a smooth, consistent assembly; which minimizes the time and difficulty required to connect and disconnect the corner members and rails; and which allows the tonneau cover sheet to be attached to and removed from the front rail without requiring removal of the front rail and/or corner members attached to the front rail.

SUMMARY OF THE INVENTION

It is therefore a primary object of this invention to provide a connector assembly which provides for the relatively quick, consistent, and simple connection and formation of a tonneau cover frame.

It is another object of this invention to provide a connector assembly having novel connecting corner members and rail members which may cooperatively and easily form a tonneau cover frame.

It is another object of this invention to provide a connector assembly that allows for the secure connection of corner members and rails and allows a tonneau cover to be formed that can withstand extended usage without significantly suffering from vibratory noise or loosening of the various connecting members and rails that form the frame.

It is yet another object of this invention to provide a connector assembly that utilizes a "one piece" corner member that is relatively inexpensive to manufacture.

It is another object of this invention to provide a tonneau frame connector assembly which permits the tonneau cover sheet to be selectively attached to and removed from the front rail without requiring the removal of the front rail and/or the corner members attached to the front rail.

According to one aspect of the present invention a connector assembly is provided which allows a tonneau frame to be quickly and easily formed. The connector assembly comprises: a substantially hollow rail having a guide path and a window; a corner member; having a base, a plug extending from said base adapted to be removably received by said hollow channel, and a generally T-shaped clip extending alongside said plug, and adapted to traverse said guide path and to engage said plug through said window, thereby allowing said corner member to securely attach to said rail.

Further objects, features, and advantages of the present invention will become apparent from any consideration of the following description and the appended claims, when taken in conjunction with the accompanying drawings.

BRIEF DESCRIPTION OF THE DRAWINGS

For a fuller and more complete understanding of the nature and objects of the present invention, reference should be had to the following drawings in which.

DETAILED DESCRIPTION OF THE INVENTION

Figure 1:
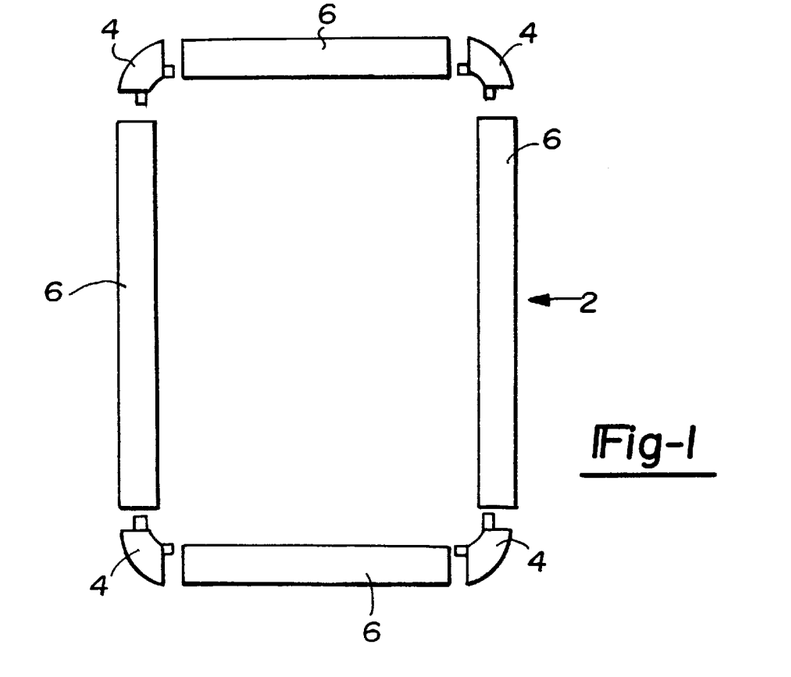
FIG. 1 is a top unassembled view of the components comprising a connector assembly made in accordance with the teachings of the preferred embodiment of the invention.
Figure 2:
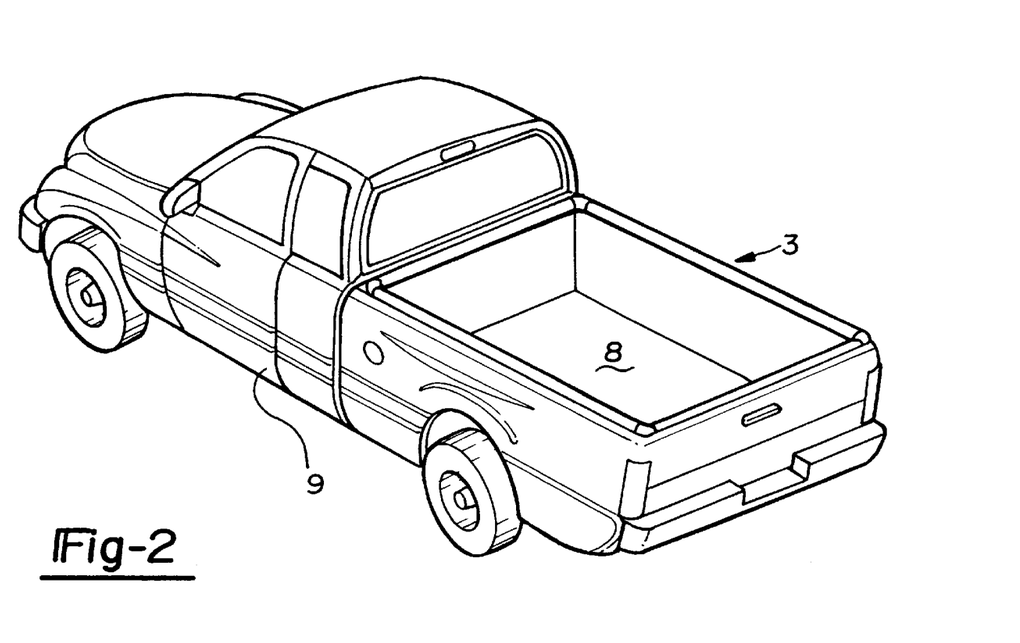
FIG. 2 is a perspective assembled view of a tonneau cover frame assembly mounted upon a typical pick-up truck cargo box and formed by the assembly of the preferred embodiment of the invention.

Referring now to FIG. 1, there is shown a connector assembly 2 made in accordance with the teachings of the preferred embodiment of the invention and comprising substantially identical connecting or "corner" members 4 (which may each correspond to any and all of the various connecting or "corner" member embodiments of the invention) and generally hollow and elongated rails 6 (which may each correspond to any and all of the various rail embodiments of the invention) which cooperatively form a tonneau frame assembly which allows a tonneau cover sheet to be removably placed over a cargo box, such as and without limitation, box 8 of FIG. 2. Particularly, rails 6 are generally made of extruded aluminum and are substantially uniform in cross section along their entire and respective lengths. In practice, rails 6 are connected and/or secured at each of their ends by corner members 4 to cooperatively form a generally rectangular tonneau cover frame assembly 3 which forms an opening which is substantially identical to the size and dimensions to the pick-up truck cargo box 8.

As shown best in FIG. 2, tonneau frame assembly 3 of the preferred embodiment of the invention is adapted to be removably mounted on top of cargo box 8 of a pickup truck 9. Particularly, frame assembly 3 is secured to the walls defining and/or forming the perimeter of the cargo box 8 by an adhesive or by a plurality of clamps or other securing structures, not shown in FIG. 2. Examples of such tonneau cover securing structures, methods, and systems are described in U.S. Pat. Nos. 5,058,652 ("the '652 Patent"), 4,639,033 and 5,301,913 of Wheatley, all of which are herein fully and completely incorporated by reference, word for word and paragraph for paragraph and are known to those of ordinary skill in the art.

Figure 3:
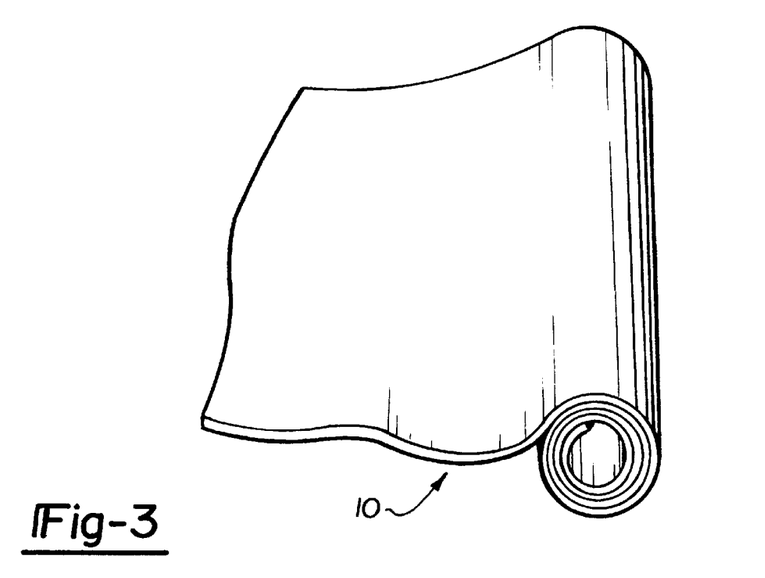
FIG. 3 is a perspective view of a tonneau cover sheet used in the preferred embodiment of the invention.

As should be appreciated by one of ordinary skill in the art, a typical tonneau cover comprises a cover sheet made of fabric or other flexible, preferably waterproof material which is usually attached to frame assembly 3 in order to protect cargo box 8 as well as its contents. FIGS. 2 and 3 illustrate one such cover sheet 10. Moreover, cover sheet 10, when properly installed on a pick-up truck or other vehicle, is generally and selectively moveable from a first "stored" or "rolled up" position to a second fully extended position in which the cover sheet 10 overlays cargo box 8.

Various fastening methods and assemblies may be used to attach the tonneau cover sheet 10 to the frame assembly 3. Such methods and assemblies include using snap fasteners and/or elongated extrusions and are described, along with other tonneau cover systems, in the '652 Patent and in U.S. Pat. No. 5,365,994 of Wheatley, which all fully and completely incorporated herein by reference, word for word and paragraph for paragraph, and which are known to those of ordinary skill in the art.

Cross-bow clips, not shown here, may be attached to the tonneau cover frame 3 and used to support the weight of the cover sheet 10, as well as other elements or objects placed thereon. These cross-bow clips and assemblies are more fully and completely described in U.S. Pat. No. 5,460,423 of Kersting et al., which is fully and completely incorporated herein by reference, word for word and paragraph for paragraph. The tonneau cover frame assembly 3 of this invention may utilize any of these prior fastening methods and system.

Figure 4:
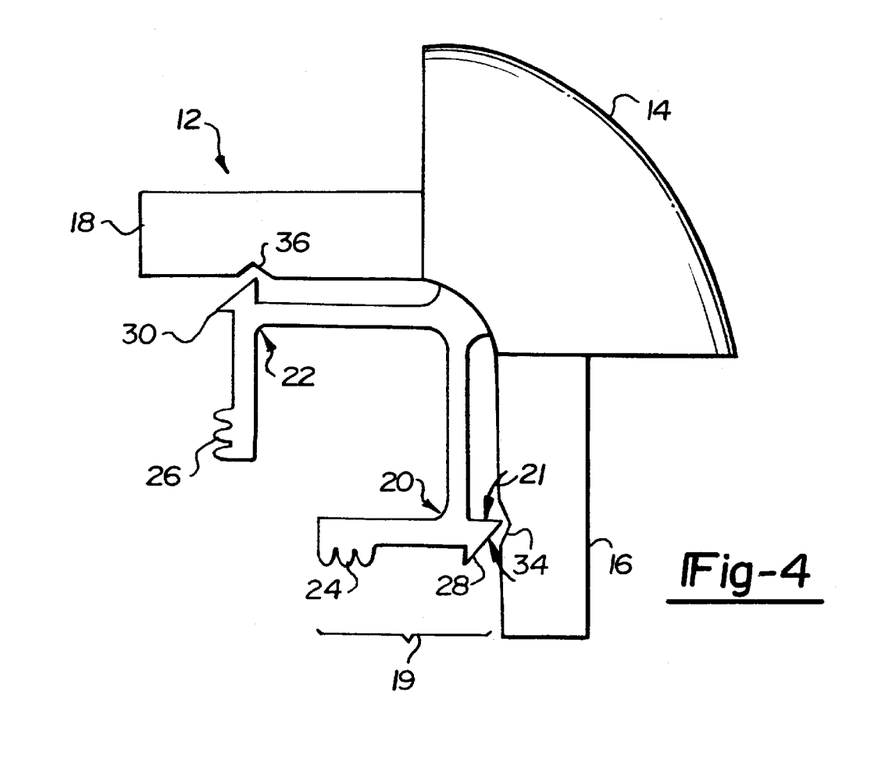
FIG. 4 is a top view of a corner member made in accordance with the teachings of the preferred embodiment of the present invention and used by the connector assembly of the preferred embodiment of the invention.

A first embodiment of a connecting or "corner" member 12 used by and included within connector assembly 2 and made in accordance with the teachings of the preferred embodiment of the invention is shown in FIG. 4. Specifically, corner member 12 includes a generally arcuate outer portion having substantially identical, generally tubular, and orthogonally positioned (with respect to each other) outer projecting plugs 16, 18 and substantially identical, generally "T-shaped" and orthogonally positioned (with respect to each other) projecting interior clips 20, 22, each having a connector or engagement portion 19 comprising respective serrated grip portion 24, 26 and a plug engaging portion 28, 30 which are adapted to removably engage respective and substantially identical indentations 34, 36 of plugs 16, 18. In the preferred embodiment of the invention, corner member 12 comprises a "one-piece" assembly constructed out of a firm, but somewhat flexible, material such as, and without limitation, conventional and commercially available plastic. In this manner, as should be apparent to one of ordinary skill in the art, corner member 12 may be conveniently and rather inexpensively manufactured and moveable.

Figure 5:
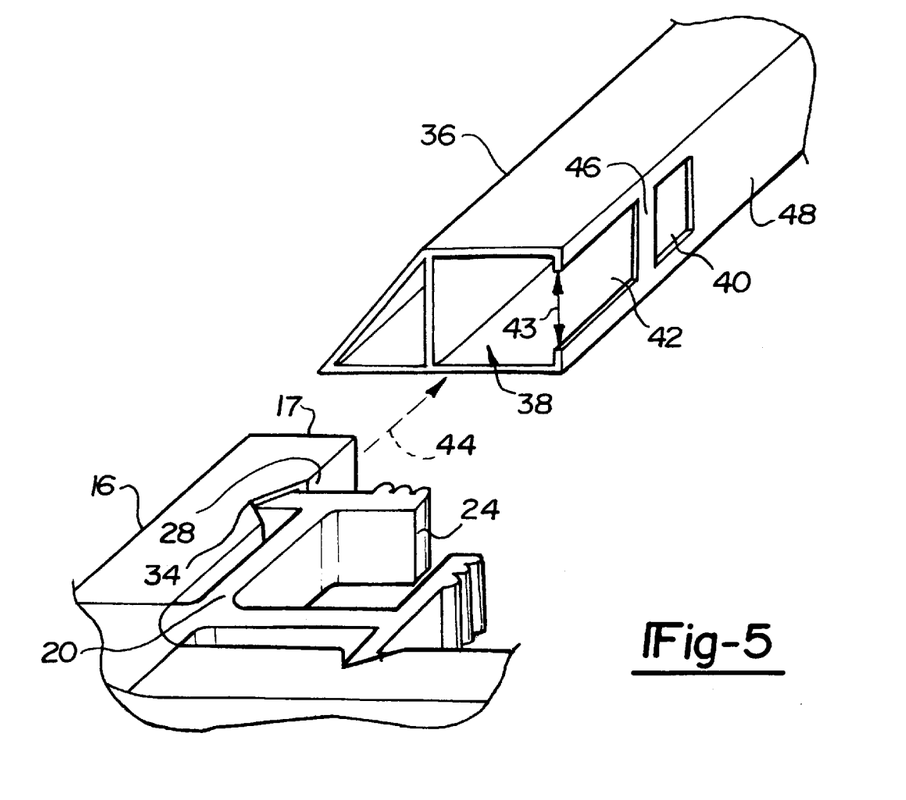
FIG. 5 is a perspective unassembled partial cut-away view of a portion of a corner member shown in FIG. 4 in unassembled relation to one end of a rail made in accordance with the preferred embodiment of the invention.

To understand the operation of corner member 12, reference is now made to FIGS. 4 and 5 which illustrate the use and/or assembly of corner member 12 with a first end portion of a rail 36 made in accordance with the preferred embodiment of the invention. As shown, rail 36 is generally uniform in cross section, and can be extruded of a durable and lightweight material, such as, and without limitation, aluminum. In the preferred embodiment of the invention, each end of rail 36 is substantially identical to the end shown in FIG. 5. Hence, while the following discussion centers upon only a single end of rail 36, it should be appreciated that the discussion applies equally well to the other ends of rail 36. Moreover, it should be appreciated by one of ordinary skill in the art that each rail 6 of FIG. 1 may compromise a rail 36 and that each corner member 4 of FIG. 1 may comprise a corner member 12. That is, it should be appreciated that each of the side, front and rear rails in the preferred embodiment of the invention are substantially identical to rail 36 which is shown in FIG. 5 and each of these rails 6 have end portions substantially identical to that shown with respect to rail 36 in FIG. 5.

As shown, rail 36 forms or comprises a generally hollow channel 38, having a generally rectangular cross section, which usually extends the length of rail 36. Rail 36 also includes an interior side wall 48 (usually facing the interior of box 8) having, at each end, a first generally rectangular opening 40 and a second generally rectangular notched guide path 42. In one embodiment of the invention, guide path 42 and opening 40 have substantially similar height 43. As described below, notched guide path 42 and opening 40 cooperate to allow a corner member 12 to be removably secured to each end of rail 36 in a new and novel way and, once secured, to allow corner member 12 to remain secured to the channel.

As shown, to connect rail 36 to corner member 12, plug 16 is inserted into the end of channel 38 in the direction indicated by arrow 44. In this preferred embodiment of the invention, plug 16 is adapted to be frictionally and removably seated within channel 38 and is further designed to be longer in length than clip 20 and to extend a longer distance from base 14 than clip 20 so that protruding end portion 17 of plug 16 will enter channel 38 first, before the entry of engaging portion 28. This design allows an operator to quickly and consistently connect the corner member and rail, since, unlike the prior art, plug 16 can be inserted into channel 38 without requiring a user to simultaneously operate, manipulate or otherwise touch clip 20.

In the preferred embodiment of the invention, as plug 16 is inserted into the end of rail 36, portion 19 follows along guide path 42 in a manner causing portion 24 to protrude outside or from rail 36. As a user continues to apply force to corner member 12 in the direction of arrow 44, end portion 28 will reach and engage wall 46. As the user continues to apply force to corner member 12, end portion 28, which is inwardly angled toward channel 38, will engage and slide over wall 46, away from wall 48 and away from channel 38. The inward angle of engaging portion 28 will permit engaging portion 28 to travel over wall 46 without requiring an operator to manipulate, or otherwise touch, clip 20. For example, and without limitation, the inventor found an angle 21 (shown in FIG. 4) of approximately thirty (30) degrees to be acceptable for the inward angle of engaging portion 28. However, other angles would are possible.

As engaging portion 28 travels over wall 46, clip 20 will flex away from plug 16 and rail 36. As the motion continues, engaging portion 28 will slide across wall 46 until it reaches window opening 40. At this moment, engaging portion 28 will enter opening 40, frictionally re-engage indentation 34, and clip 20 will return to its unflexed state. When clip 20 returns to its unflexed state, the connection of corner member 12 and rail 36 is complete. The presence of guide path 42 reduces the amount and duration that clip 20 must flex during an assembly, since clip 20 will only flex for the limited space and time required to slide across wall 46. Thus, guide path 42 prevents excess deformation and/or breakage of clip 20. Moreover, the frictional engagement of portion 28 with indentation 34, through window 40, allow the connector 12 to be securely attached to the rail 36.

Figure 6:
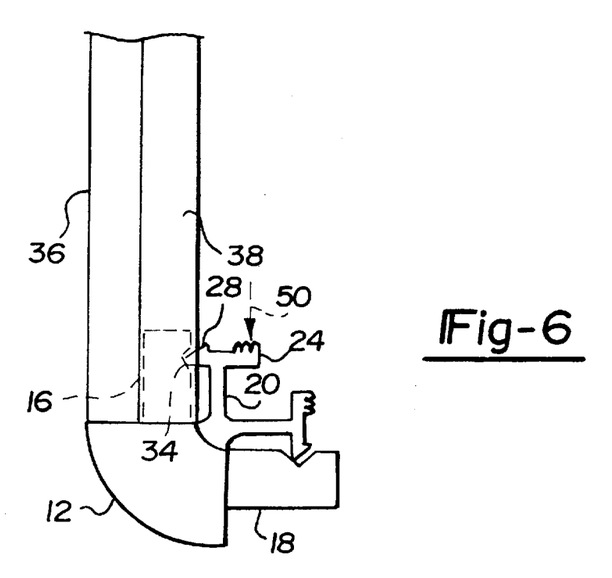
FIG. 6 is a top partial cut-away view illustrating the connection of the corner member and the rail, each of which are shown in FIG. 5.
Figures 7, 8:
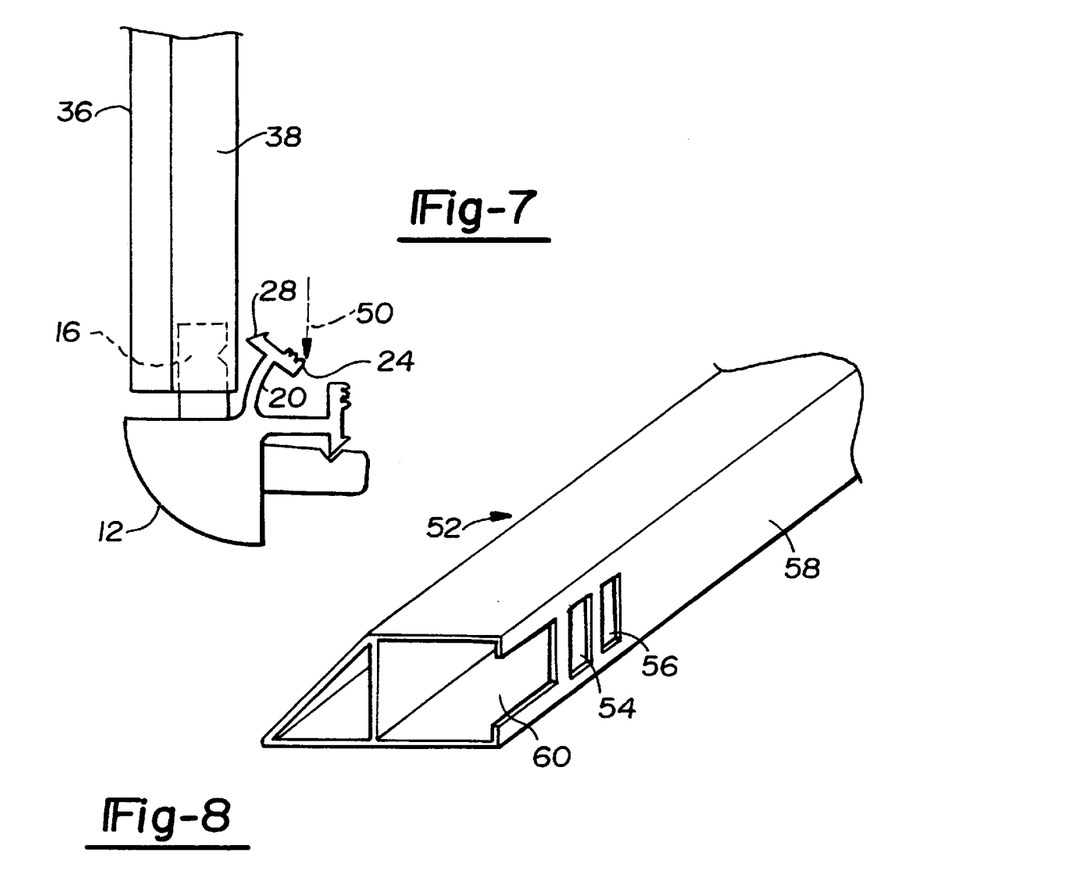
FIG. 7 is a top partial cut-away view illustrating the detachment of the corner member from the rail, each of which are shown in FIGS. 5 and 6.
FIG. 8 is a perspective partial cut-away view of one end of a rail used in a second embodiment of the present invention.

FIG. 6 illustrates a top view of the connection between corner member 12 and rail 36. As illustrated in FIG. 6, when the connection is complete, engaging portion 28 will frictionally engage and rest within indentation 34 and rail 36, through wall 40, thereby securing corner member 12 to rail 36. Also, as illustrated in FIG. 6, corner member 12 may be easily disconnected from rail 36 by the application of a force in the direction of arrow 50. In the preferred embodiment of corner member 12, grip portion 24 has ridges or other means to permit an operator to grasp grip portion 24 with a thumb, or one or more fingers, and apply force in the direction of arrow 50. Grip portion 24 allows an operator to disconnect corner member 12 and rail 36 with one simple motion. That is, by applying force in the direction of arrow 50, clip 20 will flex outward until engaging portion 28 is disengaged from opening 40. As illustrated in FIG. 7, by continuing to apply force in the direction of arrow 50, plug 16 will slide out of channel 38 until corner member 12 is completely disconnected from rail 36.

Figure 9:
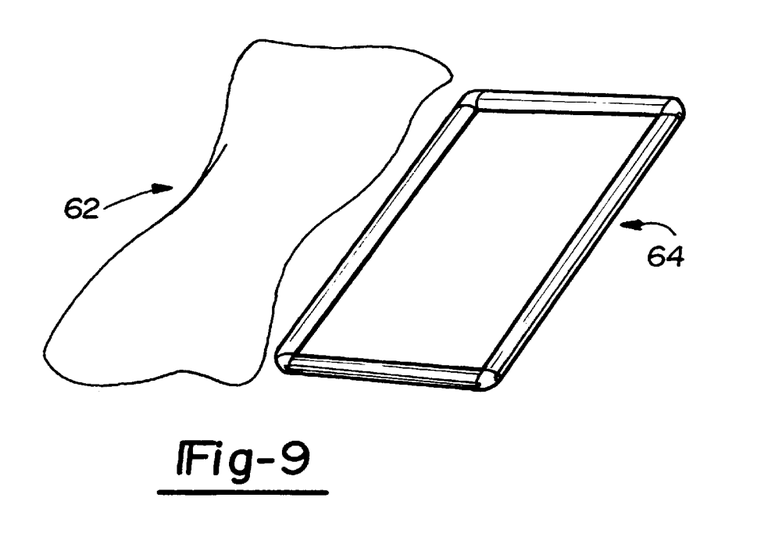
FIG. 9 is a top view of a cover sheet and tonneau cover frame.

Plug 18 and clip 22 of corner member 12 are respectively and substantially similar in form and function as plug 16 and clip 20. Moreover, as previously described, all rails used in the preferred embodiment of the invention have end portions substantially identical to rail 36. Hence, an operator may connect a plurality of rails and corner members in a substantially similar manner as described with respect to FIGS. 4, 5, and 6 to assemble a tonneau cover frame 64, as shown in FIG. 9. A cover sheet 62, similar to previously described cover sheet 10 can then be placed over and attached to the tonneau cover frame 64 to complete the tonneau cover system. Cover sheet 62 is sized to fit taut over the entirety of tonneau cover frame 64. However, due to changes in weather and temperature, cover sheet 62 will expand and contract over time, thus preventing a consistent fit. This problem is discussed in greater detail in U.S. Pat. No. 5,251,951 of Wheatley, which is fully and completely incorporated herein by reference, word for word and paragraph for paragraph, and which describes an apparatus which changes the position of the rear rail, thereby reducing longitudinal slack in the cover sheet. Another embodiment of the present invention, rail 52, illustrated in FIG. 8, is also designed to allow an operator to change the relative position of one or more rails, thereby conforming to changes in the size of the cover sheet due to weather or other causes.

Referring now to FIG. 8, there is shown a rail 52 which may be substantially similar in manufacture and design as previously described rail 36, with the only significant difference being the configuration of side wall 58. That is, as shown, rail 52 is adapted for use with previously described corner member 12. Side wall 58 includes two (2) openings 54 and 56 and a notched guide path 60 all being substantially similar in height, in one embodiment. Guide path 60 is slightly shorter in length than previously described guide path 42. Opening 56 is in a position in side wall 58 corresponding to the position of opening 40 in side wall 48 so that, when corner member 12 is inserted completely into rail 52, clip 20 engages opening 56 in a first position. Clip 20 may also selectively engage opening 54 in a substantially similar manner and secure corner member 12 in a second position. In this second position, the total length from one end of rail 52 to the end of clip 20 is increased. The presence of these first and second positions or openings 54 and 56 allows an operator to selectively increase, or decrease the perimeter of the tonneau cover frame to adjust for expansion and contraction of the cover sheet. For example, in a tonneau cover having a front and rear rail, and side rails substantially similar to side rail 52, an operator could position the rear rail further or closer to said front rail thereby compensating for longitudinal slack. It should be understood that additional openings, similar to openings 54 and 56, could be included in side wall 58, thereby allowing for a greater range of possible tonneau cover frame perimeter adjustments.

Figure 10:
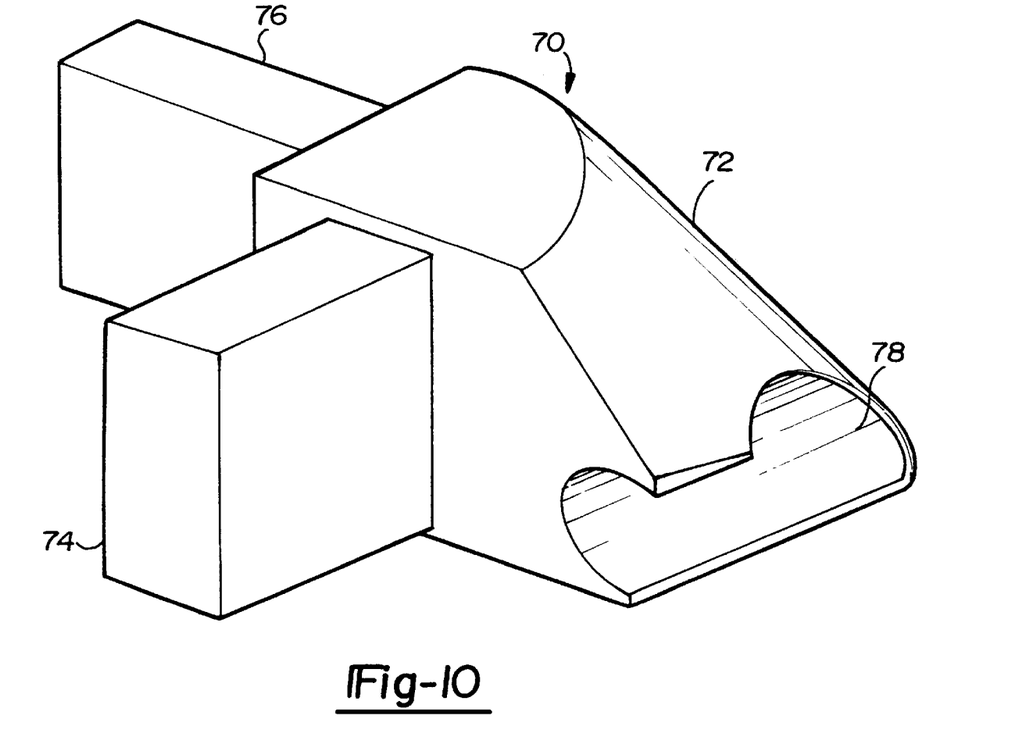
FIG. 10 is a perspective view of a corner member made in accordance with the teachings of a second embodiment of the invention.

FIG. 10 illustrates a corner member 70 made in accordance with another embodiment of the present invention. As shown, corner member 70 includes a base 72, substantially identical and generally rectangular plugs 74 and 76 which are orthogonally positioned with respect to each other, and generally cylindrical bight 78. In one embodiment, plugs 74 and 76 are substantially similar to aforedescribed plugs 16 and 18. Corner member 70 may also include clips, not shown in FIG. 10, similar in size, shape, and function to previously described clips 20 and 22. In the preferred embodiment of the invention, corner member 70 comprises a substantially "one-piece" apparatus constructed out of firm, but somewhat flexible, material such as, and without limitation, plastic. The design of corner member 70, allows it to be molded, or otherwise manufactured, in one-piece, providing for convenient and inexpensive manufacture and assembly.

To understand the operation of corner member 70, reference is now made to FIGS. 10–15. In many tonneau cover systems, the cover sheet remains attached to the front rail (e.g. the rail closest to the cab of the pick-up truck), and is selectively moved to a non-operable "rolled up" position and secured for storage when the cover is not in use. The front of the cover sheet is generally attached to the front rail using a cylindrical dowel which is sewn into the fabric, or by an extruded member, a portion of which is cylindrical or semi-cylindrical in shape, which is sewn onto the fabric. The dowel or extruded member is generally manufactured from a flexible material such as, but not limited to, conventional and commercially available plastic. Examples of cover sheet and rail attachment methods and assemblies can be found in U.S. Pat. Nos. 4,639,033 and 5,121,960 of Wheatley, which are fully and completely incorporated herein by reference, word for word and paragraph by paragraph.

Figure 11:
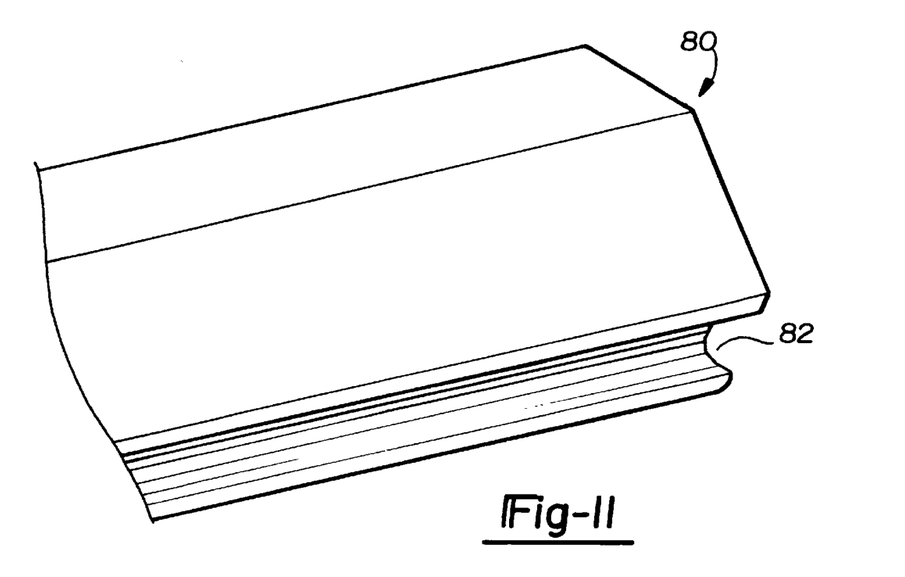
FIG. 11 is a perspective view of a front rail made in accordance with the teachings of a second embodiment of the invention.
Figure 12:
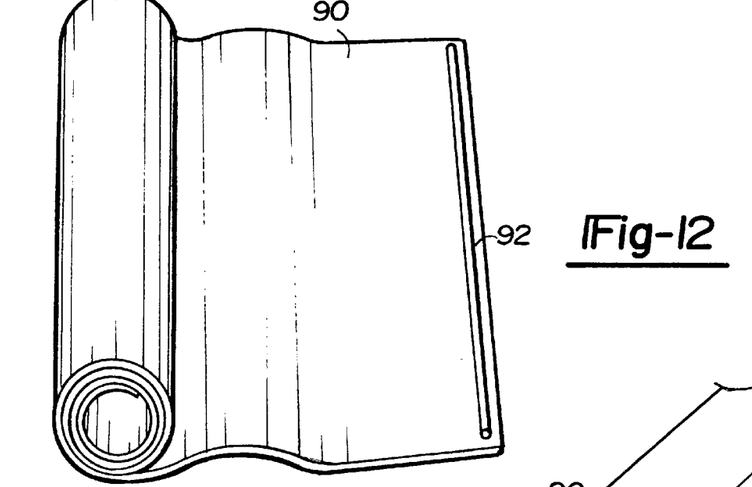
FIG. 12 is a perspective view of a tonneau cover sheet having a cylindrical fastener and used in various embodiments of the invention.
Figures 13, 14:
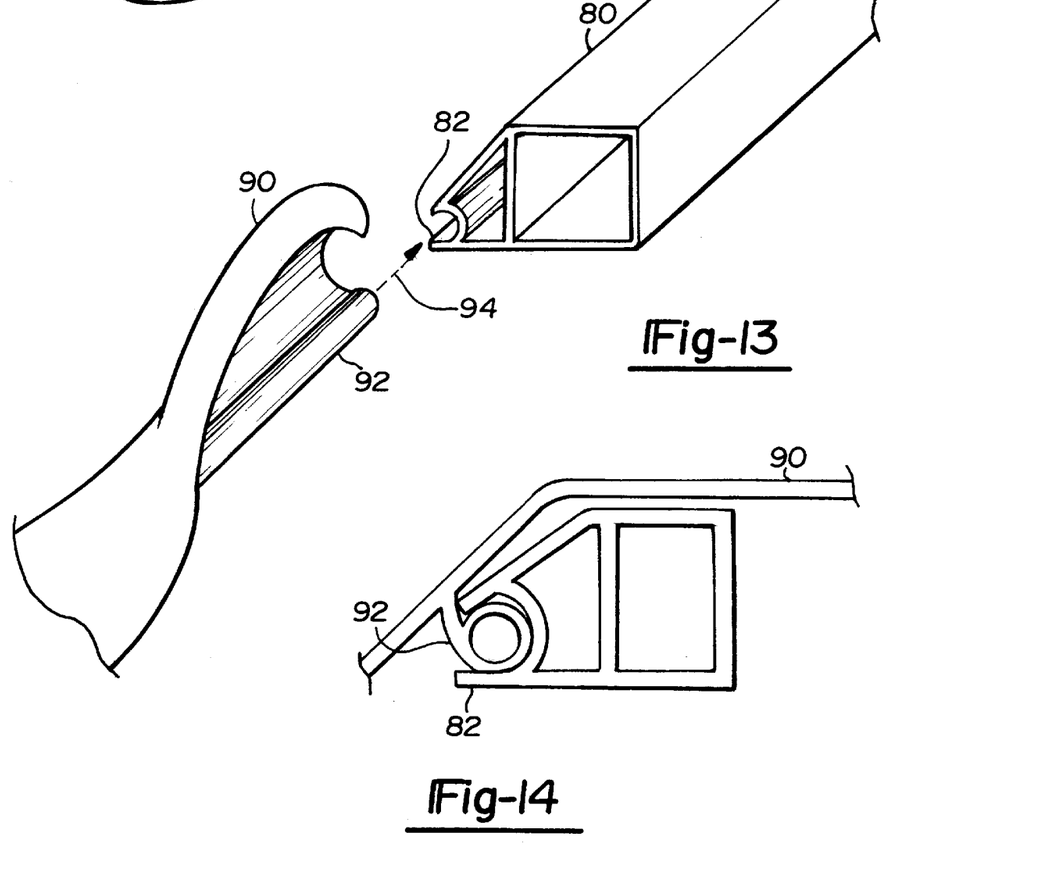
FIG. 13 is a perspective unassembled view of a front rail having a bight and a tonneau cover sheet having a cylindrical fastener, used by the various embodiments of the invention.
FIG. 14 is a cross sectional end view of a tonneau cover sheet inserted into a front rail according to the teachings of the present invention.

FIG. 12 illustrates a tonneau cover sheet 90 having a such cylindrical fastener 92 sewn into the fabric. Cylindrical fastener 92 can be one of the previously described dowel or extruded fasteners. FIG. 11 illustrates a front rail 80, similar in manufacture to previously described rail 36 and/or rail 52. The outer edge of the front rail 80 has a somewhat circular, concave bight 82 which extends the entire length of front rail 80. In one embodiment of the invention, fastener 92 is approximately as long as front rail 80 and has a diameter slightly smaller than bight 82 so that it may slid into either end of front rail 80. This procedure is illustrated in FIG. 13, in which fastener 92 is moved in the direction of arrow 94 and thereby inserted into bight 82. FIG. 14 is a cross sectional end view of cover sheet 90 removably attached to front rail 80. As illustrated in FIG. 14, fastener 92 removably resides comfortably and securely within bight 82.

Figure 15:
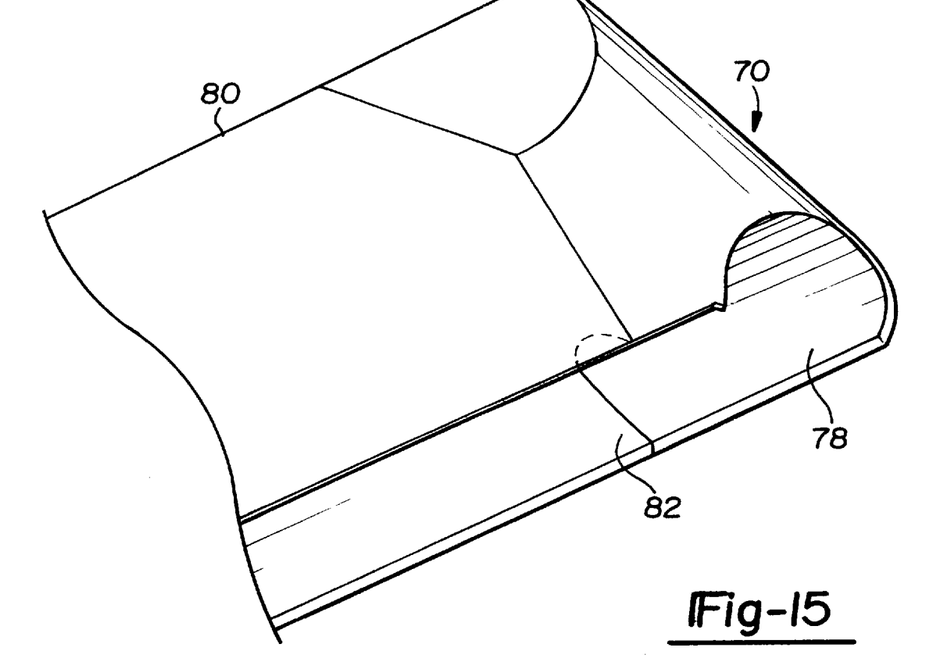
FIG. 15 is a perspective view of the connection of a corner member and a front rail.

As previously discussed, the systems of the prior art required that either one, or both, corner members be disconnected from the ends of the front rail in order to attach the cover sheet onto the front rail. Thus, the prior art systems required the front rail to be removed from the tonneau cover frame whenever the cover sheet was to be attached or removed. Corner member 70 substantially eliminates the need for these "extra procedures" and allows cover sheet 90 to be attached to front rail 80 without disconnecting any rails and/or corner members. As illustrated in FIG. 15, bight 78 is substantially similar in cross section to bight 82. Thus, when corner member 70 is attached to front rail 80, bight 78 cooperates with bight 82 to form one continuous cylindrical path into which fastener 92 may be inserted. It should be understood that only one (1) of the four (4) corner members of a typical tonneau cover frame need contain a bight similar to bight 78 for the invention to function properly. As illustrated, corner member 70 would correspond to the front driver side of a pick-up cargo box. However, the inventor has found it most convenient for a bight, substantially identical to bight 78, to be introduced into the corner member corresponding to the front passenger side of the cargo box, so that when parked on a street an operator could attach and detach the cover sheet away from traffic.

Figure 16:
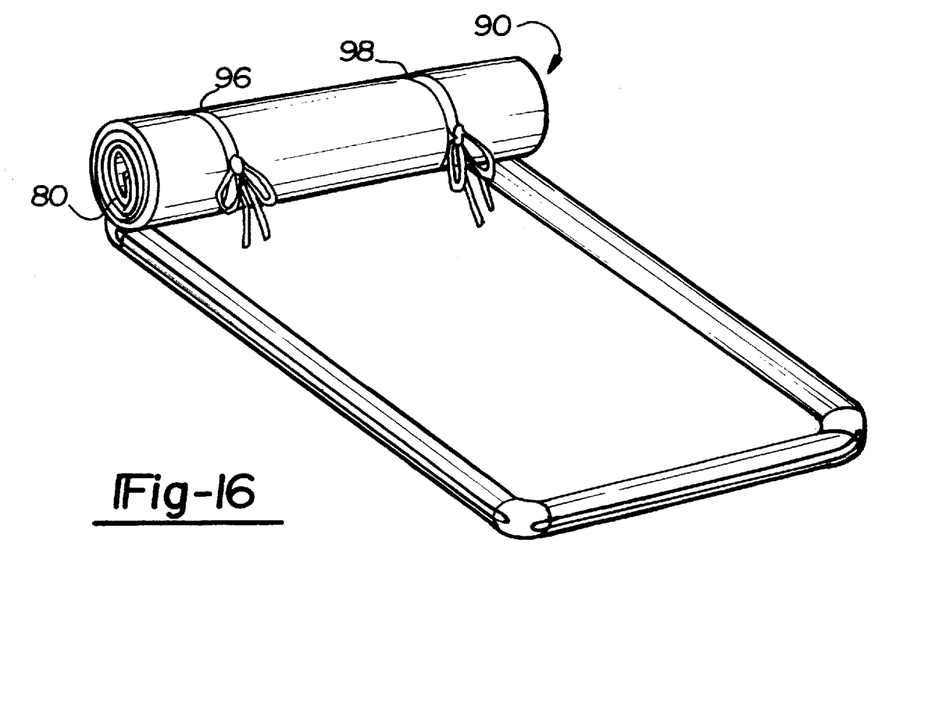
FIG. 16 is a perspective view of a cover sheet rolled up and secured to a front rail by tie straps.

When the tonneau cover is in use, the side rail attachments prevent lateral movement of fastener 92 within or out of bight 78 and 82. When cover sheet 90 is not in use, it may be rolled up and secured to front rail 80, as illustrated in FIG. 16. Tie straps 96 and 98 may be placed underneath front rail 80 and tied tightly to secure cover sheet 90 and prevent fastener 92 from moving laterally within or outside of bights 82 and 78.

Figure 17:
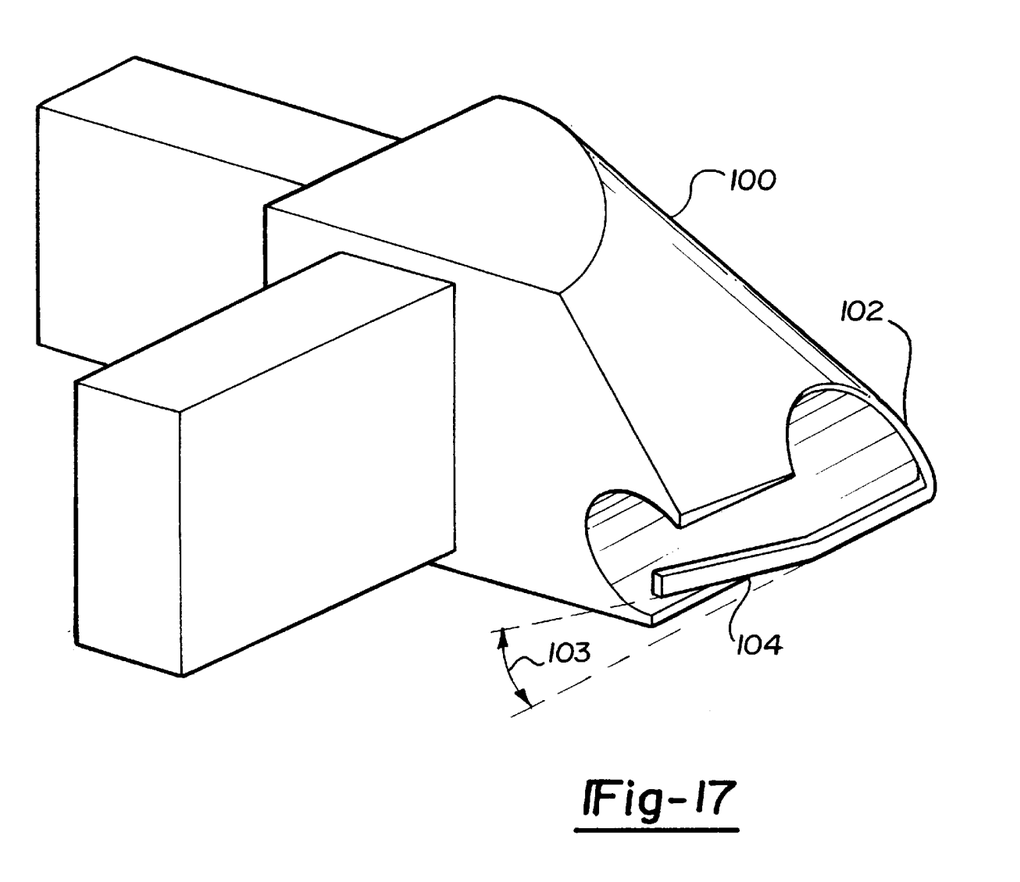
FIG. 17 is a perspective view of a corner member having a bight and a clip and comprising an alternate embodiment of the invention.

Reference is now made to FIG. 17, which illustrates yet another connector embodiment that provides additional security against lateral movement of cover sheet 90. In this embodiment, corner member 100 comprises a "one-piece" apparatus substantially similar in manufacture and function to corner member 70 with the exception of clip 104. As shown, clip 104 extends at an angle 103 of about thirty (30) degrees into bight 102. Corner member 100 can be connected to front rail 80 in a substantially similar manner as previously described corner member 70. Cover sheet 90 can then be attached to front rail 80 by inserting fastener 92 into bight 102 and 72. As fastener 92 is inserted into bight 102, clip 104 will be flexed downward, permitting fastener 92 to enter bight 72. Once fastener 92 is completely within bight 72, clip 104 will return to its original position, thereby preventing fastener 92 from moving laterally out of bight 72, when cover sheet 90 is not in use. To remove cover sheet 90, clip 104 is depressed and fastener 92 is slid over clip 104 and out of bight 102.

It should be understood that other devices could be used in conjunction with corner member 70 to prevent the lateral movement of fastener 92 when cover sheet 90 is not in use, such as, and without limitation, a plug or a cap inserted into bight 78.

It should be further understood that the descriptions and illustrations of the aforementioned embodiments in no way limit the scope of the invention. Inventor realizes, as should one of ordinary skill in the art, that various changes and modifications may be made without departing from the spirit and scope of the invention as defined in the following claims.

I claim:

1. A connector assembly, comprising:
   a generally hollow rail having first and second openings;
   a corner member having a plug and a flexible clip, said plug being being shaped to permit insertion of said plug into said generally hollow rail, said insertion being effective to cause said clip to flex and to automatically engage said plug through said second opening thereby securing said corner member to said rail.

2. The connector assembly of claim 1 wherein said plug is longer than said flexible clip.

3. The connector assembly of claim 1 wherein said corner member is a one-piece plastic assembly.

4. The connector assembly of claim 1 wherein said plug includes an indentation and said clip includes a serrated portion which is adapted to selectively engage said indentation.

5. A corner member for use as part of a tonneau cover frame, said frame having a front rail with a first concave bight for supporting a tonneau cover sheet with an attached elongated fastener being shaped to permit insertion of said fastener into said first concave bight, said corner member comprising:
   a base, said base having a second concave bight being coincident with said first concave bight and shaped to permit passage of said fastener through said second concave bight and into said first concave bight; and
   a first plug and a second plug which extend from said base.

6. The corner member of claim 5 wherein said corner member is a one-piece, plastic assembly.

7. The corner member of claim 5 wherein said corner member includes a clip projecting into said second concave bight and which permits passage of said fastener through said second concave bight only when said clip is depressed.

8. A tonneau cover assembly adapted to cover a certain area of a vehicle, said area being formed by opposed walls, each wall having a top surface, said tonneau cover assembly comprising:
   a frame structure including a plurality of rails each having a hollow channel, an inner side facing said certain area, a front rail having a first concave bight;
   a flexible cover sheet having a front edge, a plurality of side edges, and a central region bounded by said front edge and said side edges, said front edge and said side edges being positionable over said side walls and said frame structure so that said cover sheet can extend over the entirety of said open area;
   an elongated convex fastener attached alongside said front edge and shaped to be received by, and fit securely into, said first concave bight; and a plurality of corner members each having a base, and a first plug and a second plug which extend from said base and are each individually received by said hollow channel, said plurality of corner members including at least one first corner member having a first base having a second concave bight substantially similar in diameter as said first concave bight, extending the entire length of said base and being coincident with said first concave bight when said first corner member is received by one of said hollow channel of said front rail, thereby allowing said fastener to be received by said first concave bight by passing through said second concave bight.

9. The assembly of claim 8 wherein said first corner member includes a clip projecting into said second concave bight and permitting passage of said convex fastener through said second concave bight only when said clip is depressed.

10. A connector assembly for use in selectively forming a tonneau cover frame, said assembly comprising:
  a plurality of corner members; each of said corner members comprising:
    a base;
    a first plug projecting from said base;
    a second plug, substantially identical to said first plug and orthogonally projecting from said base with respect to said first plug;
  a clip having first and second "T"- shaped portions, each of which have a plug engagement portion which engages one of said plugs; and
  a plurality of generally hollow rails, each of said rails having opposite ends which frictionally receive one of said plugs and which further have a window through which one of said plug engagement portions engages one of said plugs, thereby allowing each of said corner members to be securely connected to two of said rails, thereby forming a tonneau cover assembly.

11. The connector assembly of claim 10 wherein each of said rails include first and second windows.

12. The connector assembly of claim 10 wherein each of said "T"-shaped portions includes a serrated portion which is adapted to selectively disengage said plug engagement portions from said one of said plugs.

* * * * *